Aug. 30, 1949. A. SIMMON 2,480,423
CONTRAST CONTROLS IN PHOTOGRAPHIC ENLARGERS
Filed Jan. 31, 1948 4 Sheets-Sheet 3

INVENTOR:
Alfred Simmon
BY Walter E. Wallheim
ATTORNEY.

Aug. 30, 1949.   A. SIMMON   2,480,423
CONTRAST CONTROLS IN PHOTOGRAPHIC ENLARGERS
Filed Jan. 31, 1948   4 Sheets-Sheet 4

INVENTOR:
Alfred Simmon
BY Walter E. Wallheim
ATTORNEY.

Patented Aug. 30, 1949

2,480,423

UNITED STATES PATENT OFFICE 2,480,423

CONTRAST CONTROL IN PHOTOGRAPHIC ENLARGERS

Alfred Simmon, Jackson Heights, N. Y., assignor to Simmon Brothers, Inc., Long Island City, N. Y., a corporation of New York Application January 31, 1948, Serial No. 5,586

9 Claims. (Cl. 88—24)

1

The object of this invention is to provide in a photographic enlarger means by which the contrast of the enlarged image can be adjusted.

In a preceding application, Serial No. 5,368, I disclosed a device of this character which comprised a cathode ray tube, a beam splitting device, a photoelectric cell and a modifying circuit and which operated in such a way that part of the light emitted by the moving luminous point of the cathode ray tube which illuminated the photographic negative, was made to impinge upon the photoelectric cell, causing there the passage of an electric current which was modified by the modifying circuit, and then fed back into the control grid circuit of the cathode ray tube, modulating thereby the emitted light. A device of this type can only be used to reduce the contrast, but cannot be used to increase it. This is quite clear since, when an attempt is made to increase contrast with this device, the resulting cathode ray tube current will either, in theory, become infinite, and in practice high enough to cause the destruction of the device, as long as the circuits have long time constants, and in the case of circuits with sufficiently short time constants, the device will break into oscillations since it comprises a typical feed back circuit. The object of the invention disclosed in the present application is a contrast control device which is free from this limitation and which can be used for contrast increases as well as contrast reduction.

For this purpose, an arrangement must be made which renders the modifying current independent of the modified current, in other words, a device which is free from the feed back feature mentioned above. I accomplish this by using a similar device as the one described above, but by first recording in some suitable manner the photocell current while keeping the light of the cathode ray tube constant and then playing back the recorded photocell current, and modulating the light output of the cathode ray tube accordingly while making the print.

A typical device built according to this invention is described in the following specifications and shown in the appended drawings in which

Fig. 2 is a circuit diagram;

Fig. 4 shows a family of curves in a system of rectangular coordinates; this figure is used for

2 the explanation of the function of the modifying circuit;

Fig. 5 is an elevational view of an adjustable mask which forms part of the modifying circuit;

Fig. 7 is a fragmentary cross-sectional view along the plane of line 7—7 in Fig. 5;

Fig. 8 is a detail, in perspective, of a part of the mask; and

Fig. 9 shows a ribbon which forms part of the recording device.

Like characters of reference denote similar parts throughout the accompanying drawings and the following specification.

In the interest of simplicity, voltage sources in Fig. 2 have been represented as batteries, but it will be understood that in reality, these batteries can be readily replaced in the usual manner by transformers, rectifiers and condensers. Amplifiers and linear sweep circuits or saw tooth wave generators have been merely shown diagrammatically since the exact circuit of these devices is well known and forms no part of this invention. Practically all circuits shown in Fig. 2 are quite sensitive to small voltage fluctuations and, therefore, in reality, automatic voltage regulators or stabilizers must be used in order to render all voltages substantially independent of small line fluctuations. In the interest of clarity, these stabilizers as well as supply circuits for the various filaments for cathode ray and rectifying tubes have been omitted. These filaments are, actually, either fed from small batteries or filament transformers.

General mechanical design

Figure 1:
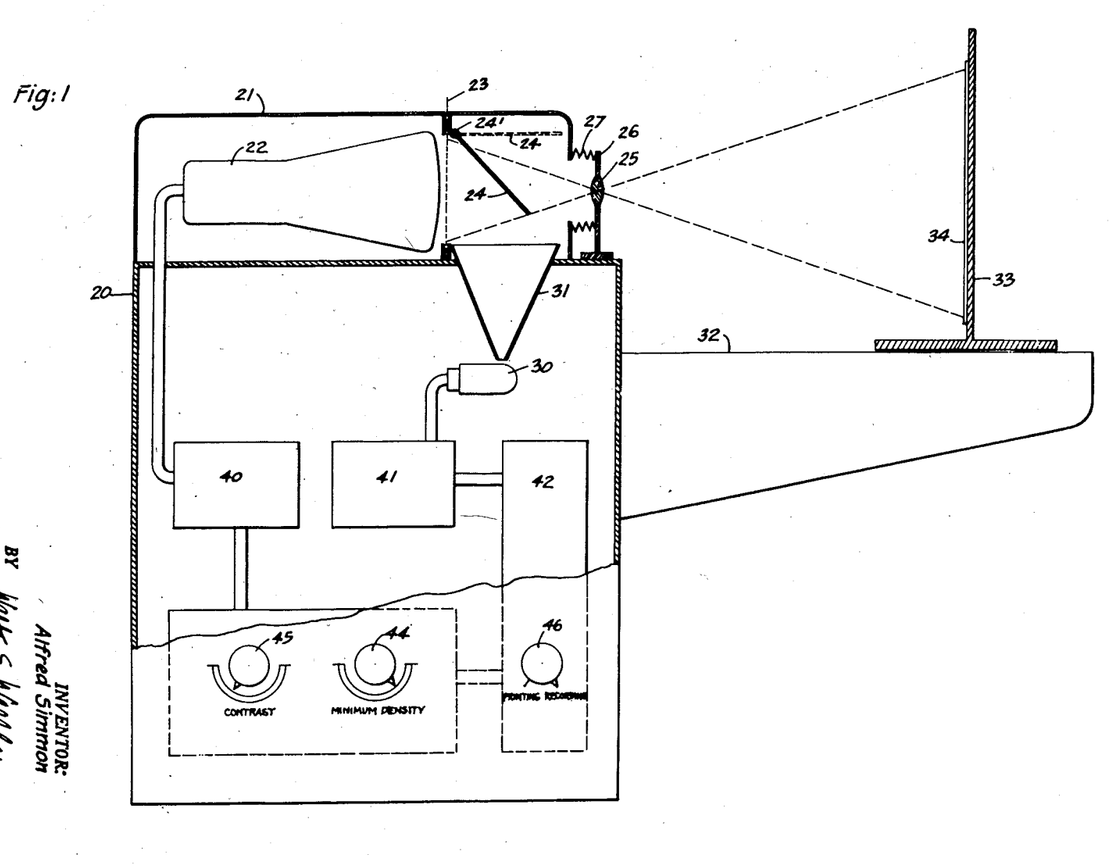
Fig. 1 shows, partially cross-sectionally and more or less diagrammatically, an elevational view of the device.

Referring to Fig. 1, a preferred embodiment of this device comprises a rectangular cabinet like base 20 which contains most of the electrical circuit elements. In Fig. 1, these elements are merely indicated schematically since their exact disposition within this cabinet is of no importance. Mounted on top of the cabinet is a projector within a housing 21 which contains a cathode ray tube 22, means to support a negative or transparency 23, and a mirror or reflector 24. The position of this reflector can be changed by means of a supporting pivot 24' so that it can assume either a 45° position shown in solid lines or a horizontal position shown in dotted lines. Mounted in front of housing 21 and movable relative thereto for focusing purposes is a lens support 26 with a lens 25. A bellows 27 provides in the usual manner an extensible but light tight connection. A photoelectric cell 30 is mounted below mirror 24 and a light collecting element 31 is preferably disposed between 24 and 30.

A bracket 32 is attached to the right side of cabinet 20 carrying a support 33 for a photographic paper 34 on which the print is made. The photographic paper is attached to the support 33 by means of spring clips or the like which, however, are not shown in the drawing. The support 33 can be shifted horizontally for the adjustment of the magnification ratio of the enlarger.

The various circuit elements arranged within cabinet 20 are, in addition to the photoelectric cell 30, a supply circuit 40 for the cathode ray tube, a supply circuit 41 for the photoelectric cell, a recording device 42, and a modifying circuit 43. Some elements of the modifying circuit 43 are adjustable in accordance with a minimum density and the contrast of the photographic negative, respectively, and these adjusting means terminate in handwheels 44 and 45 which protrude through the front panel of the cabinet so as to be easily accessible to the operator. There is also a two position switch 46 by means of which the recording device as well as other circuit elements can be adjusted for recording or printing, respectively, i. e., the device can be made to run consecutively through two operating cycles, during the first of which the light intensities will be recorded and during the second of which the recorded light intensities will be played back, modulating the light output of the cathode ray tube 22 while the actual print is being made.

The device as shown is merely a preferred embediment and while in this instance the horizontal arrangement of the main light beam appears advantageous, this is not necessary, and the light beam may also be arranged in a vertical or any other direction if so desired.

Cathode ray tube and supply circuit

The cathode ray tube 22 is of substantially conventional design such as, for example, used in oscilloscopes or television receivers, except that the screen should preferably be formed by a phosphor with negligibly short persistance as will be explained in more detail at the end of this chapter. It comprises a glass vessel 52 which contains all other elements such as a filament 53, a cathode 54 heated thereby, a control grid 55, two focusing members 56 and 57 including a second control grid 57', two pairs of deflection plates 58 and 59, respectively, and a screen 60 capable of light emittance.

The supply circuit, operatively connected to this tube, also does not depart from conventional design. It comprises substantially four parts, a filament circuit which is not shown, an acceleration and focusing circuit, a control grid circuit and deflection circuits.

The acceleration and focusing circuit comprises a source of D. C., for example, a battery 62 which is connected to a potentiometer 63. The various points of this potentiometer are, respectively, connected to the cathode 54, the two focusing members 56 and 57 and the screen 60, each of these elements having a positive potential with respect to the preceding one.

The control grid 55 has always a negative bias with respect to the cathode 54 which is necessary since otherwise the electrons emitted by the cathode cannot be correctly focused to a point upon the screen. During the first operating cycle, i. e., during the recording process, the negative bias of the control grid corresponds to the portion of potentiometer 63 between points 63' and 63''. During this operating cycle, a switch 263 has the position shown in solid lines. The condition of the control grid during the second operating cycle, i. e., during the actual printing process, differs from its former condition in two ways. A constant negative bias corresponding to the voltage between points 63'' and 63''' has been added and a variable voltage which depends upon the recorded photocell current, as it is being played back and modified by the modifying circuit, is being deducted therefrom. Switch 263 assumes during the second operating cycle the position shown in dotted lines.

The two pairs of deflection plates 58 and 59 are, respectively, connected to two sweep circuits which comprise saw tooth wave generators 65 and 66. These saw tooth wave generators are of well known design and deflect the luminous point formed upon screen 60 with substantially constant velocities but with different frequencies and in different directions, or more precisely, in directions which are perpendicular to each other. The result of this arrangement is that the luminous spot formed upon screen 60, scans a predetermined area of that screen in a television like manner. Each of these two deflection circuits is biased, respectively, by means of a small battery 67 and 68 and a potentiometer 69 and 70. By means of these additional bias circuits the starting points of the two sweep circuits can be properly adjusted. Associated with the two linear sweep circuits are two switches 267 and 268. During the first operating cycle, i. e., during the recording process, these switches assume the position shown in dotted lines.

It is necessary to provide means to reduce the persistence of the light emission of the screen of the cathode ray tube to a negligible magnitude. These means may be either associated with the tube itself, or they may be associated with the circuit.

Tubes are now commercially available which have a phosphor with a spectral emission predominantly in the blue-green and the ultra violet region, and some of these screens have extremely short persistence. This characteristic can be further improved by a filter which absorbs the visible rays and transmits substantially the ultra violet only. Since the absorption characteristic of an ordinary photographic negative for ultra violet are not noticeably different from the absorption characteristics for visible rays, the use of ultra violet instead of visible rays for this purpose is not objectionable. Tubes of this type are commercially available, for examle, type 5WP15, Radio Corporation of America. These tubes are sometimes called "flying spot" cathode ray tubes and are used to scan a photographic transparency such as a moving picture film for the purpose of transmitting moving pictures by television. For a more complete description of this tube, I refer to the technical information sheet issued by the Radio Corporation of America on this tube on January 15, 1948.

The use of tubes with a short persistance screen is desirable, but not strictly necessary, because the undesirable effect of persistence can also be eliminated by other means. It must be kept in mind that the absolute length of time of this persistence is not important, but only its ratio to the scanning speed of the light spot. For this particular application we are not at all forced to scan the picture with speeds customary in television work, but we can slow the scanning speed down as much as necessary. For example, whereas 30 frames per second are customary in television work, we may scan as slowly as one frame per second, or even one frame in ten seconds. This does not in any way affect the exposure times, because the integrated light energy falling upon any individual point of the print is, of course, independent of the scanning speed. Therefore, time lags which would be quite objectionable at television speeds will be negligible as soon as the scanning speed is reduced accordingly.

While the two expedients mentioned up to this point are the simplest, there exists still another means which comprises the introduction of equalizing networks, preferably of the resistance-capacitance type, with suitable time constants, into what in television work would be called the video-amplifier. Networks of this type have not been shown in the appended drawings, since they form no part of this invention.

Reflector

The reflector 24 is an ordinary plane mirror which may assume one of two positions. In the first position the mirror is arranged under a 45° angle, deflecting the light coming from the cathode ray tube and passing the transparency downwardly into the photoelectric cell 30. In this position the current passing the photoelectric cell is recorded by the recording device, but no light reaches lens 25 and no image is formed on the sensitive paper 34. The mirror is hinged on pivot 24' and during the second operating cycle assumes a horizontal position shown in dotted lines. In this position the light is not reflected into the photoelectric cell, but is projected by lens 25 on the sensitized sheet 34 where an enlarged image of the transparency 23 is formed.

As an added operating convenience the three switches 263, 267 and 268 as well as two additional switches associated with the recording device, and to be described later, may be mechanically or electrically connected to the mirror 24 so that automatically the correct electrical connections are made for either of the two cycles in accordance with the position of mirror 24. Mechanical and electrical interlocks of this type are well known in the art and have, therefore, not been shown in the appended drawings.

Photoelectric cell and supply circuit

The photoelectric cell 30 may be of any desired type known in the art, but in practice I prefer the so called photoelectric multiplier since additional amplifiers are usually not necessary with this type of tube. Referring to Fig. 2, a typical cell of this type comprises a glass vessel 130, a photosensitive cathode 131 and nine additional electrodes 132. The cathode 131 and the nine electrodes 132 are connected to respective points of the potentiometer 133 upon which a voltage is impressed by a battery 134 or other source of voltage. The cathode 131 is connected to the most negative point at the extreme left of potentiometer 133 and a last electrode 132' is connected to the extreme right point of this potentiometer receiving the most positive potential. The wire connecting 132' to the right end of potentiometer 133 is interrupted and a resistor 135 is inserted in this circuit.

The voltage built up across resistor 135 depends, therefore, upon the current circulating in the last loop of the photoelectric multiplier circuit and upon the resistance value of element 135.

Recording device

The current passing the photoelectric cell 30 or, more precisely, the voltage impressed upon resistor 135 is fed into a recording device and there recorded.

This recording device may be of any convenient design. It can, for example, be a phonograph record or a light sensitive film, forming a record somewhat in the manner of a sound track. For the present purpose, however, I prefer as the most convenient method to use a so-called wire recording device, i. e., a device which comprises a steel wire or, more broadly, a ribbon of magnetizable material which, during recording, is moved past a magnetizing device and which can be played back by moving it in a similar manner past a magnetic pick-up. The ribbon is usually stored on a reel and moved from this reel to another, and both the magnetizing device and the pick-up usually comprise iron cores carrying a coil of insulated wire and equiped with a small gap through which the ribbon moves. Generally, amplifiers of suitable design are used both during the recording and during the play-back cycles. The exact construction of these wire recording machines as used for the present invention is not important and they have been shown in Fig. 2 merely schematically. While I have shown a separate magnetizing device for recording and a separate pick-up for play-back connected to individual amplifiers, it is perfectly conceivable to use, in reality, the same device and even the same amplifier for both duties.

The photoelectric current passing the photoelectric cell 30 as a result of the light from the cathode ray tube 22 impinging upon it, is fed into the recording device which is shown on the right side of Fig. 2 and which comrises a schematically shown amplifier 301, a switch 302, a magnetizing device 303, two reels 304 and 305, and a ribbon 306 of magnetizable material moving from one of these reels to another one. The magnetic pick-up which is used during the play-back cycle is called 307 and is connected to a switch 308, and to another amplifier 309.

The output voltage of this amplifier can, for reasons which will be explained later, be adjusted by means of a potentiometer 310 which includes a slidable contact 311. This potentiometer will, in reality, be preferably of cylindrical shape, and the movable contact 311 will be attached to a shaft operable by handwheel 44 already shown in Fig. 1. The two reels 304 and 305 are, of course, connected to a suitable motor drive which drives them in such a way that the ribbon 306 is moved past the magnetizing device 303 and the pick-up device 307 with a constant velocity.

A brief contemplation of the device as described up to this point will immediately disclose a certain difficulty. It is obviously necessary to provide certain means of synchronization between the recorded photocell currents and the position which the moving point of light on screen 60 occupies. Manifestly, as soon as the scanning movement of the screen is permitted to shift ever so slightly with respect to the recorded photocell current, the subsequent modulation of the light emitted by the cathode ray tube during the second operating cycle, i. e., when the image is actually printed, will be entirely jeopardized, since then, for example, the luminous point may appear bright when it should appear dark and vice versa. In order to render such an occurrence impossible, I provide the following means:

Two additional recording systems are used which are shown on the left side of Fig. 2, consisting, respectively, of reels 310, 311, 312 and 313, driving two additional ribbons 314 and 315 of magnetizable material past two magnetizing devices 316 and 317 and past two magnetic pick-ups 318 and 319. The magnetizing devices 316 and 317 are energized, respectively, by means of amplifiers 321 and 322, the input wires of which are, respectively, connected across the two pairs of deflection plates 58 and 59. The magnetic pick-ups 318 and 319 are connected to amplifiers 323 and 324.

It can be seen that when switches 267 and 268 are in the positions shown in solid lines, the deflection plates 58 and 59 are directly connected to the sweep circuits 65 and 66. This takes place during the first operating cycle when the photoelectric currents are recorded. Certain voltages are built up across deflection plates 58 and 59 which are amplified by amplifiers 321 and 322 and by means of the magnetizing devices 316 and 317 recorded upon magnetizable ribbons 314 and 315. During the play-back period, i. e., when the actual print is made, switches 267 and 268 are in the position shown in dotted lines. The sweep circuits 65 and 66 are then disconnected from the respective deflection plates 58 and 59, but these deflection plates are then connected to the output leads of the amplifiers 323 and 325 which are, in turn, energized, respectively, by the magnetic pick-ups 318 and 319.

In other words, during the first cycle a record is made not only of the photoelectric currents, but also of the two sweep circuit voltages. During the second period, when the actual print is made, both the photoelectric currents and the sweep circuit voltages are played back, and during the second operating cycle, the scanning movement of the luminous point of screen 60 is controlled, not by the sweep circuits themselves, but by their records upon ribbons 314 and 315.

It is obvious that now for perfect synchronization between photocell currents and sweep circuits during the play-back period, a mere mechanical connection between the three ribbons 306, 314 and 315 is sufficient. This can be done in a number of ways. For example, by using different carrier frequencies, the three magnetic impressions could conceivably be super-imposed upon a single wire. This scheme, however, does not appear very promising since magnetizable wire usually does not respond to frequencies over 10,000 so that the choice of carrier frequencies appears to be too limited and a more mechanical solution of the problem appears preferable. While it is possible to connect three steel wires in some suitable manner, the best solution appears to be the one which is schematically shown in Fig. 9. This figure shows a ribbon 340 made from paper or the like, i. e., from some flexible but non-magnetizable material to which three ribbons 306', 314' and 315' made from magnetizable material are affixed. Instead of using metallic iron, iron oxide powder or some similar substance in connection with some suitable binder can be used. In this case, reels 304, 310 and 312, as well as reels 305, 311 and 313 would, respectively, be replaced by two single reels. It is clear that in this way, perfect synchronization between the magnetic impressions of the photocell current, ribbon 306' and the two sweep circuits, ribbons 314' and 315', can be maintained easily and with certainty.

Modifying circuit—mathematical relations

The recorded photocell current as it is played back is fed into a modifying circuit. The output voltage of this modifying circuit is then impressed upon the grid 55 of the cathode ray tube and used there to modulate the brightness of the luminous spot formed on the screen in such a way that all contrasts are increased or reduced in uniform proportions. The modifying circuit must, therefore, deliver an output voltage which is a definite mathematical function of the input current. This mathematical function will be derived in the following paragraph. Since a device of the character described is most valuable when contrast increases are contemplated, the mathematical relations valid under these conditions will be analyzed first, although the mathematical relations for the other case, i. e., for contrast reductions, are very similar.

It has been explained that the device is adapted to run through two consecutive operating cycles. During the first cycle, the photocell currents will be recorded as the negative is scanned by the luminous spot on the screen of cathode ray tube 22. During the second operating cycle these recorded photocell currents will be played back while the actual print is made. The following relations hold true for the first operating cycle during which the photocell currents are recorded.

During this operating cycle the current passing the cathode ray tube is constant, and so is the light emitted by the luminous point on the tube screen. It is logical to use during this period at all times the maximum current that the cathode ray tube is capable of carrying, i. e., $$I_0 = I_{max} \qquad (1)$$

These currents are usually expressed in $\mu a.$ (microamperes).

Under these conditions, the light intensity in the plane of the tube screen, i. e., before the light passes the negative, becomes $$L_1 = aI_{max} \qquad (2)$$

$L_1$ is expressed in foot candles or in corresponding metric units, and $a$ is a constant depending upon the characteristics of the cathode ray tube, measured in $$\frac{\text{foot candles}}{\mu a.}$$

The light intensity at the film stage level, i. e., after the light has passed the negative is $$L_2 = L_1 . 10^{-D} \qquad (3)$$

$L_2$ is again expressed in foot candles, and D is the density of the photographic transparency at the point which, at any given instance, is illuminated by the luminous spot of the cathode ray tube.

The intensity of the light impinging upon photocell 30 is, of course, proportional to, but smaller than $L_2$, depending chiefly upon the distance of the photocell from the transparency, i. e., $$L_3 = bL_2 \qquad (4)$$

$b$ is a dimensionless constant.

The photocell current is proportional to the light impinging upon the photocell, or $$i_1 = dL_3 \qquad (5)$$

$d$ is a constant denoting the light sensitivity of the photoelectric cell in $$\frac{\mu a.}{\text{foot candles}}$$

This current or, more precisely, a voltage proportional to it, is recorded by the recording device during the first operating cycle, and played back during the second operating cycle. I shall assume the simplest case in which the amplifiers are so adjusted that the input voltages or currents equal the output voltages or currents, and I shall write the equations for the various currents and light intensities which prevail during the second operating cycle when the actual picture is printed, under this assumption.

This means $$i_2 = i_1 \qquad (6)$$

$i_2$ being the recorded photocell current as it is played back, or the output current of the recording device.

This current is fed into the modifying device and converted there into a voltage according to a mathematical function which, as yet is unknown, so that I can merely state $$e = f(i_2) \qquad (7)$$

This voltage $e$ is then fed into the control grid circuit of the cathode ray tube 22 or, in other words, $e$ is added to the constant bias which was impressed upon the control grid during the first operating cycle and which caused a current of $I_{max}$ to pass the cathode ray tube. Within certain limits the relation of cathode ray tube current and additional bias is linear so that I can write $$I = I_{max} - ge \qquad (8)$$

$I_{max}$ is again the maximum current that the cathode ray tube is capable of conducting and $g$ is a constant, depending upon the individual characteristics of the cathode ray tube, and which has the dimension $$\frac{\mu a.}{volt}$$

The light output of the cathode ray tube now differs from the light output that I had during the first operating cycle since the current is now not $I_{max}$ but $I$, as expressed in Equation 8. During the second operating cycle, the light intensity at the tube screen level, i. e., before passing the negative, therefore, is $$L'_1 = aI \qquad (9)$$

In a similar way, the light intensity at the film stage level, i. e., after passing the negative, becomes $$L'_2 = L'_1 \cdot 10^{-D} \qquad (10)$$

where $a$ and $D$ are the same magnitudes as defined previously for Equations 2 and 3.

The light is now not projected into the photoelectric cell, but by the lens 25 upon the sensitized sheet 34. The light intensity at this level is $$L'_3 = hL'_2 \qquad (11)$$

where $h$ is a dimensionless constant, depending essentially upon the optical conditions of the projecting system, i. e., the magnification ratio and the diaphragm opening of the lens.

The contrast of the negative, i. e., the difference between the maximum and minimum density shall be called $C$. The desired contrast of the projected image shall be called $C'$ and, of course, $C'$ must equal the contrast range of the selected photographic paper.

The contrast between the brightest, most transparent, point of the negative and a point with a density $D$ is $$C_0 = \log L_{3\,max} - \log L_3 \qquad (12)$$

The desired contrast between the same points becomes $$C'_0 = \log L'_{3\,max} - \log L'_3 \qquad (13)$$

I shall now impose the condition that the device shall increase all contrasts uniformly, i. e., $$\frac{C'}{C} = \frac{C'_0}{C_0} \qquad (14)$$

I shall also assume that the brightest point of the projected image shall remain unchanged, i. e., $$L_{3\,max} = L'_{3\,max} \qquad (15)$$

That this last equation represents a reasonable condition can be easily seen since it merely means that the cathode ray tube current becomes a maximum $I_{max}$ whenever the luminous point on the cathode ray screen passes the most transparent point of the negative with a density $D_{min}$. When the luminous point passes darker points, it will automatically be correspondingly weakened so that the projected image receives still less light for the darker points, whereby the contrast is automatically increased.

The unknown function of Equation 7 can be computed in the following manner: $L_3$ and $L_{3\,max}$ can be computed from Equation 4 by replacing $D$ with $D_{min}$, i. e., $$L_3 = abI_{max} \cdot 10^{-D}$$

$$L_{3\,max} = abI_{max} \cdot 10^{-D_{min}}$$

These values can be introduced in Equation 12 which results in $$C_0 = D - D_{min} \qquad (16)$$

In a similar way, $L'_3$ and $L'_{3\,max}$ can be computed from Equation 11.

$$L'_3 = ahI \cdot 10^{-D}$$

$$L'_{3\,max} = ahI_{max} \cdot 10^{-D_{min}}$$

These values can be introduced into Equation 13.

$$C'_0 = [\log I_{max} - \log I] + [D - D_{min}] \qquad (17)$$

Equations 13, 16 and 17 are now combined:

$$\frac{C'_0}{C_0} = \frac{C'}{C} = \left[\frac{\log I_{max} - \log I}{D - D_{min}}\right] + 1$$

or $$\frac{C'}{C} - 1 = \frac{\log I_{max} - \log I}{D - D_{min}} \qquad (A)$$

Equation 5 can be written as $$i_1 = abdI_{max} \cdot 10^{-D} = i_2$$

This can be solved for $D$ $$D = \log\left(\frac{abdI_{max}}{i_2}\right) \qquad (B)$$

Equation B and Equation 8 are now introduced into Equation A which is then solved for $e$ with the following result:

$$e = \frac{I_{max}}{g}\left[1 - \left(\frac{i_2}{abdI_{max} \cdot 10^{-D_{min}}}\right)^{\frac{C'}{C}-1}\right]$$

This equation represents the unknown function of Equation 7, but can be simplified in the following two ways: First, it is clear that $$abdI_{max} \cdot 10^{-D_{min}} = i_{max}$$

$i_{max}$ is the maximum photocell current which passes the photocell when the luminous spot of the cathode ray tube illuminates the most transparent point of the negative. I can further set $$C - C' = \Delta C$$

where $\Delta C$ is the contrast difference between the actual and the desired contrast of the negative. Depending upon whether the actual contrast of the negative is larger or smaller than the desired contrast, $\Delta C$ may become positive or negative. In the present case, I contemplate a contrast increase or, C is smaller than C' and $\Delta C$ is a negative magnitude. With these two simplifications, Equation 7 can be written as follows:

$$e = \frac{I_{max}}{g}\left[1 - \left(\frac{i_2}{i_{max}}\right)^{-\frac{\Delta C}{C}}\right] \quad (7)$$

This is the mathematical function according to which the modifying circuit is to work, i. e., the recorded photocell current $i_2$ is converted into a voltage $e$ which is fed into the control grid circuit of the cathode ray tube 22 during the second operating cycle when the actual print is made with modulated light.

In case a contrast reduction is desired, the derivation is very similar. In place of Equation 15, not the brightest, but the darkest point of the projected image remains unchanged, i. e., $$L_{3\ min} = L'_{3\ min}$$

and Equation 7 reads $$e = \frac{I_{max}}{g}\left[1 - \left(\frac{i_2}{i_{2\ min}}\right)^{-\frac{\Delta C}{C}}\right] \quad (7a)$$

Modifying circuit—preferred design

The design of the modifying circuit itself is basically of no importance and any circuit which will modify an input current into an output voltage according to Formula 7 will be satisfactory. Circuits of this type are frequently networks using at least one non-linear resistance or impedance element such as one of the so called semi-conductors or a device using a saturated iron core or one of the various types of vacuum tubes. A preferred modifying circuit, however, which is in many respects superior to these networks, has been disclosed in my co-pending application Serial No. 791,439, now Patent No. 2,474,380, and will be described as a preferred example in the following.

A modifying circuit built accordingly consists of three principal parts, a cathode ray tube 150, a stationary mask 180 and a photoelectric cell 190. It is emphasized that the cathode ray tube 150 and the photoelectric cell 190 are in no way identical with elements 22 and 30 which have been described above. They are entirely independent therefrom and perform entirely different functions.

The broad principle of the modifying circuit is that in some suitable manner a luminous line is formed on the screen of the second cathode ray tube 150, that the incoming signal which in this case is the output current of the recording device, is used to deflect this line in a direction at right angles to itself and that thereby, part of the light emitted by this line is cut off by the stationary mask placed in front of the luminous screen of tube 150. The light permitted to pass this mask is then made to impinge upon the second photoelectric cell 190 which forms part of the modifying circuit, not upon cell 30. The current passing this second photoelectric cell 190, or more precisely, the corresponding voltage impressed upon a resistor of suitable magnitude is then during the actual printing process supplied as additional bias to the control grid 55 of the original cathode ray tube 22 which scans the transparency in the manner described.

This circuit is shown in detail as the lower half of Fig. 2. The cathode ray tube 150 contains a filament 151, a cathode 152 heated thereby, a control grid 153, two focusing members 154 and 155 including a second control grid 155', two pairs of deflection plates 156 and 157 and a screen 158 capable of light emittance.

A luminous line can be formed upon this screen by any desired means, for example, by giving the focusing elements 154 and 155 a proper configuration. I prefer, however, to use a conventional cathode ray tube which forms a luminous point upon the screen which is transformed into a line by means of a linear sweep circuit 160 operatively connected to the deflection plates 157. This sweep circuit is a saw tooth wave generator of the customary type which has a high frequency compared to the frequency of the signal impressed upon the other pair of deflection plates. It can be seen that the other set of deflection plates 156 is operatively connected to the output amplifier 309 of the recording device. This amplifier is, in turn, energized by the current excited in the magnetic pick-up 307 by the moving magnetized wire 306. Both sets of deflection plates 157 and 156 are biased by batteries 161 and 162 which are connected, respectively, to potentiometers 163 and 164. By means of this arrangement, the starting points of the two sweep circuits connected to deflection plates 156 and 157 can be adjusted.

The rest of the supply circuit for the second cathode ray tube is conventional. It consists of a battery 170 and a potentiometer 171, the various points of which are connected to the elements within the cathode ray tube in such a way that the control grid 153 assumes a negative potential with respect to the cathode 152, but that 154 has a positive potential with respect to 152, 155 a positive potential with respect to 154, and finally 158 a positive potential with respect to 155.

Figure 3:
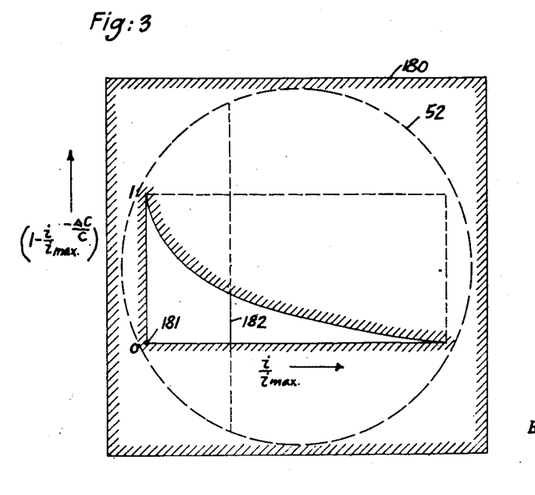
Fig. 3 is a mask which forms part of the modifying circuit.

In front of screen 158, and preferably immediately adjacent thereto is a mask 180 which is again shown in Fig. 3. This mask has an aperture which directly represents the mathematical function expressed in Formula 7. This mask is a thin plate made of opaque material such as black paper and sheet metal, and its vertical width varies as a function of the horizontal distance from a point of reference 181 in accordance with Formula 7. For convenience, the lower borderline of this aperture is made a straight line, but this is not necessary and both the upper and lower borders may be curved as long as the vertical width of the aperture is the desired function of the horizontal distance from the point of reference 181. It can be seen that only that part of the light emitted by the luminous line 182, which is behind said aperture can pass and that the other parts which are shown in dotted lines above and below this portion are blocked off. The light impinging upon the second photoelectric cell 190 is, therefore, proportional to the length of that portion of line 182 which appears behind the aperture or is a direct function of the shape of said aperture, in other words, varies in accordance with Formula 7, provided the aperture is fabricated correctly.

If the luminous line upon the screen 158 of cathode ray tube 150 is formed in the preferred manner by a voltage of high frequency impressed by saw tooth wave generator 160 upon deflection plates 157, means must be provided to keep the output current or voltage of the photoelectric cell 190 from being modulated accordingly. This can be done simply by connecting a condenser 400, shown in dotted lines, of suitable magnitude across resistor 195, or a more complete filter formed in the usual manner of a network of capacitances and inductances can be connected in parallel with 195. A filter of this type has not been shown in detail since its design is well known and forms no part of this invention. If, however, the luminous line upon screen 158 is formed by other means, for example, by the proper configuration of the focusing elements 154 and 155, this filter means can be dispensed with.

The distance between photoelectric cell 190 and cathode ray tube 150 must, of course, be large enough so that all points of the luminous line have substantially the same distance from the photosensitive cathode to the photoelectric cell 190. This cell may again be of any desired design and I have again shown a photoelectric multiplier tube because then a complicated amplifier can be avoided. The cell again has a photosensitive cathode 191, and nine additional electrodes 192, the last one being called 192′. The supply circuit comprises a battery 194, and a potentiometer 193, the various points of which are in the usual manner connected, respectively, to elements 191 and 192. The wire between the extreme right point of potentiometer 193 and the last electrode 192′ is interrupted to receive a resistance element 195. The voltage impressed upon this resistance element by the current passing it represents directly the value $e$ used in Formula 7. $e$ is then by means of two wires 196 and 197 fed back into the grid control 55 of the first cathode ray tube 22, i. e., voltage $e$ is added to the constant negative bias which control grid 55 has with respect to cathode 54.

The actual arrangement as shown in Fig. 2 is slightly different. As shown, the minimum bias of the cathode ray tube grid 55 corresponds to the portion of the potentiometer between points 63′ and 63″. This bias is imposed upon the grid during the first operating cycle, i. e., during the recording process and causes an unmodulated current $I_{max}$ to flow through the cathode ray tube. During the second operating cycle, i. e., during the actual printing, a constant voltage corresponding to the portion of the potentiometer between points 63″ and 63‴ is added and a voltage impressed upon resistance 195 is deducted from the first named bias. The reasons for this will be fully explained in the next paragraph.

As can be seen by Formula 7, the output voltage $e$ of the modifying circuit is a function of the input current $i_2$, but the function itself must be adjusted in accordance with the maximum photocell current $i_{max}$, and the difference between the actual and the desired contrast $\Delta C$. In the interest of simplicity, I shall assume that the operator always uses the same paper so that $C'$ is constant. The maximum photocell current $I_{max}$ could then, for example, be computed by measuring the minimum density $D_{min}$ and, likewise, the actual contrast of the negative C could be measured, and a mask which properly expresses the function of Equation 7 could then be chosen and placed in front of cathode ray tube 150. A device adapted to measure the maximum density and the contrast of a photographic negative automatically and rapidly has been disclosed in my co-pending application Serial No. 793,666, now Patent 2,467,057. Since, obviously, a large number of masks would have to be kept on hand, this procedure is not very convenient and an improvement is possible in the following manner:

Equation 7 can be written as follows:

$$e = \frac{I_{max}}{g} - \frac{I_{max}}{g} \cdot \left(\frac{i_2}{i_{max}}\right)^{\frac{-\Delta C}{C}} \quad (7b)$$

The left term $$\frac{I_{max}}{g}$$

is a constant for a given cathode ray tube and can, therefore, simply be added to the constant negative bias impressed upon the grid 55. The constant negative bias effective during the first or recording cycle corresponds to the portion of the potentiometer 63 between points 63′ and 63″. During the second or printing cycle, another constant voltage corresponding to the portion of the potentiometer between points 63″ and 63‴ will be added thereto, and this last named portion corresponds to the voltage $$\frac{I_{max}}{g}$$

The modifying circuit will now be adjusted, not in accordance with the function of Equation 7, but in accordance with the right term of Equation 7b, or $$e_1 = \frac{I_{max}}{g} \cdot \left(\frac{i_2}{i_{max}}\right)^{\frac{-\Delta C}{C}} \quad (7c)$$

Owing to the fact that the second term of Equation 7b is preceded by a minus sign the polarity of the output voltage of the modifying circuit must now be reversed, i. e., $e_1$ must now be deducted from the constant bias between points 63′ and 63″, and in the circuit diagram of Fig. 2 the connecting wires 196 and 197 have been shown accordingly.

It has already been explained that the mathematical function of the modifying circuit must, for any given negative, be adjusted in accordance with the values of $i_{max}$ and C. This can be done in a number of ways, but I prefer the following which can be best explained with the aid of Fig. 4 showing a family of curves representing $$\left(\frac{i_2}{i_{max}}\right)^{\frac{-\Delta C}{C}}$$

as a function of $$\frac{i_2}{i_{max}}$$

$i_2$ can assume any value between $i_{min}$ and $i_{max}$. This means that the largest value of $$\frac{i_2}{i_{min}}$$

will be unity. The smallest value can be computed from Formula 5 and likewise the ratio $$\frac{i_{max}}{i_{min}}$$

can be computed therefrom by substituting $D_{min}$ or $D_{max}$ for D. The result is $$\frac{i_{max}}{i_{min}} = 10^C$$

This can also be seen without any computation by considering the simple fact that the ratio of photocell currents must obviously be equal to the ratio of the $10^{-D}$ values.

Fig. 4 has not merely a purely mathematical significance, but is open to a more direct physical interpretation since it directly represents the screen 158 of the cathode ray tube 150 of the modifying circuit. The various curves represent configurations of masks which must be placed in front of this screen for the various values of C or ΔC. During operation, there appears on this screen a luminous vertical line 182 which is deflected rapidly to the left or to the right in accordance with the recorded photocell current of photocell 30 as it is played back through the pick-up 307 and the amplifier 309. The extreme right position of this luminous line represents the maximum value of $$\frac{i}{i_{max}}$$

These two positions have been shown in Fig. 4 by dotted lines 182′ and 182″, respectively. If I now adjust the circuit so that the extreme right position of this luminous line coincides with the value of $$\frac{i}{i_{max}}=1$$

the contrast C can be directly judged from the extreme left position 182″ that the luminous line 182 will assume. This adjustment can be made by moving sliding contact 311, until the extreme right position of the luminous line coincides with the unit value of $$\frac{i}{i_{max}}$$

For convenience, a second scale denoting C values can, therefore, be placed immediately below the $$\frac{i}{i_{max}}$$

scale in Fig. 4 and, during operation, the contrast C can be directly read from the extreme left position assumed by the luminous line 182. The C values can be determined by the formula $$\frac{i_{max}}{i_{min}}=10^C$$

which means $$C=-\log\frac{i_{min}}{i_{max}}$$

The minus sign means that the C values increase in the opposite direction from the $$\frac{i_{min}}{i_{max}}$$

values. This scale has been shown in Fig. 4.

Figure 6:
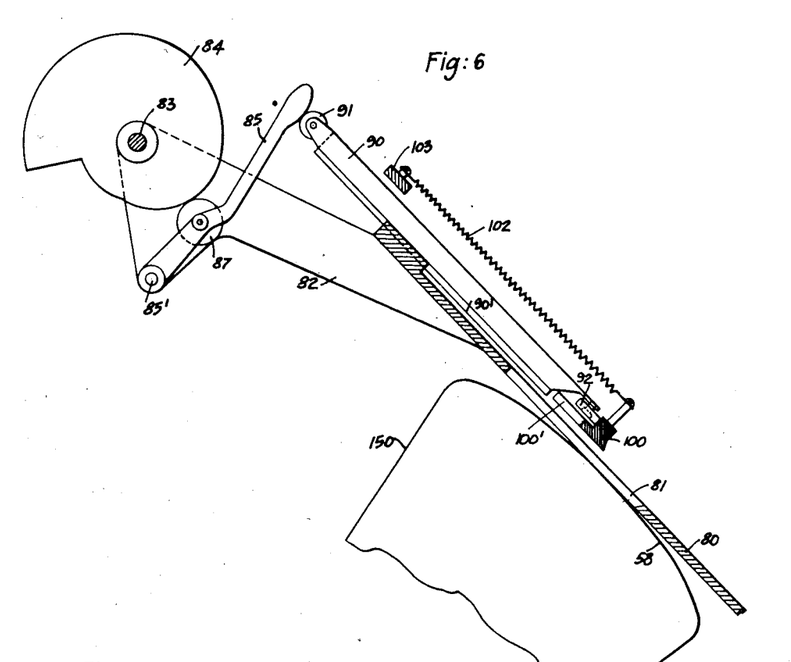
Fig. 6 is a sectional view along the plane of line 6—6 in Fig. 5.

In order to obviate the necessity of changing masks, the fixed mask shown in Fig. 3 is replaced by an adjustable mechanism shown in Figs. 5 and 6 which is adapted to represent a family of curves, depending upon the choice of C.

All parts of the mechanism are mounted on a supporting plate 80 having a preferably rectangular aperture 81 which is again placed directly in front of the fluorescent screen 158 of the cathode ray tube 150. As can be seen in Fig. 6, two brackets 82 are attached to the frame 80 supporting a shaft 83 to which a number of generally spiral shaped cams 84 are attached. In the example shown, eleven of these cams would be attached to shaft 83, but only one has been shown in Fig. 6 for the sake of clarity, and while the shape of all cams will be generally spiral shaped, they will not all have precisely the same shape, depending upon the nature of the function which it is desired to impress upon the electrical circuit. Each cam is in series with a lever 85 which swivels around a fixed pivot 85′ and which carries a cam following roller 87. The front end of this lever is in operative contact with the upper end of a slidable member 90. Eleven of these members are provided in the example shown in Fig. 5. In order to reduce friction, the upper ends of these members 90 carry rollers 91 and the lower ends carry other rollers 92. The two axes of rollers 91 and 92, respectively, are perpendicular to each other as can be seen from Fig. 6. Rollers 92, in turn, are in contact with members 100 which are linked together in a chain-like manner. One end of the chain formed by these links 100 is fixedly but rotatably attached to a pivot 101, and the individual links are biased by relatively long springs 102 which are attached to a bridge like transverse member 103. The manner in which slidable members 90 are supported by frame 80 can be seen in Fig. 7 which shows a cross-sectional view in the plane of line 7—7 of Fig. 5. The shape of the links 100 is again shown in a three-dimensional representation in Fig. 8. Both slidable members 90 and chain links 100 are equipped with certain fins 90′ and 100′, respectively, which make it possible to move these elements relative to each other and still block the passage of light between them. The result of this arrangement is that the lower border of chain 100 in Fig. 5 becomes the upper boundary of the aperture of frame 80, replacing thereby the aperture of the fixed mask shown in Fig. 3.

By rotating cam shaft 83 with the eleven cams 84, the operator can cause the eleven slidable members 90 to assume higher or lower positions within their respective tracks and thereby the links of chain 100 to assume correspondingly different positions. If the configurations of the various cams 84 are chosen properly, the chain 100 will assume, depending upon the rotation of cam shaft 83, all possible shapes as shown in Fig. 4. For C=1.00 the upper boundary of the aperture will be represented by a concave curve, but any decrease of C will not only change simultaneously the curvature of this line, but will also move it in a downward direction, the curves becoming at first less convex and then becoming concave as shown for the two curves for C=.50 and .25. The operator thereby has it in his power to adjust the function by which the current passing photocell shall be modified within wide limits, depending upon the choice of the parameter C.

Operation

The operation of the device can be fully understood from the following specifications: The negative 23 is placed in front of the screen 60 of the cathode ray tube 22, Fig. 1. Mirror 24 is placed into the 45° position, shown in solid lines, and switches 263, 267, 268, 302 and 308 are placed into the position shown in solid lines. For convenience, these switches are all operated in unison by handwheel 46 shown in Fig. 1 which is placed for the first operating cycle in the position named "recording." The position of the mirror and the switches may, as has been mentioned already, be synchronized mechanically or electrically. The device is then connected to the power line, and the photocell currents as well as the voltages of the two sweep circuits are then recorded on ribbons of magnetizable material such as schematically shown in Fig. 9. The current is then interrupted and handwheel 46 is then placed into the "printing" position. In this position, switches 263, 267, 268, 302 and 308 are in the position shown in dotted lines, and simultaneously mirror 24 assumes the horizontal position also shown in dotted lines. In this position, lens 25 is free to project an image of the transparency 23 onto the support 33 for the sensitized sheet 34. However, before an actual print can be made, handwheels 44 and 45 have to be adjusted to the respective values of the minimum negative density and the negative contrast, respectively, and this is preferably done in the following manner: The photocell currents, as they are being played back, are fed into the modifying device which preferably comprises a second cathode ray tube 150. They are used here to deflect a luminous line in the manner described in the above specifications. The operator now observes through a window in cabinet 20, not shown in the drawings, the position of this luminous line which, depending upon the recorded photocell current, oscillates rapidly between an extreme right and an extreme left position. By means of handwheel 44 which is operatively connected to sliding contact 311, the operator now adjusts the extreme right position of this luminous line until it coincides with the zero value of the C scale. In this position $$\frac{i}{i_{max}} = 1 \text{ or } i = i_{max}$$

This, of course, takes place when $D = D_{min}$. After this adjustment has been made, the operator observes the extreme left position of the luminous line which, for example, is shown in Fig. 5 as 182″. The extreme left position of this line directly indicates the contrast of the negative on the C scale. After the contrast value has been determined in this manner, handwheel 45 is adjusted to the corresponding position. This adjustment changes, in turn, by means of the mechanism shown in Figs. 5 and 6, the shape of the mask 180 placed between cathode ray tube 150 and photoelectric cell 190, and this takes care to make the output voltage of the modifying circuit correspond to the correct function which must be impressed upon control grid 55 of cathode ray tube 22. The device is now ready for a print, the photocell current is again played back in the manner described, and fed into the modifying circuit, and from there impressed upon the control grid 55. The contrast C of the negative is thereby changed to the desired contrast C′ which represents the contrast range of the selected photographic paper.

What happens in detail in the various circuits will be described in the following paragraph:

During the first operating cycle the current passing the cathode ray tube 22 is constant and the light output of the moving spot upon screen 60 has thereby also a constant value. By the coaction of the deflection plates 58 and 59 and the sweep circuit 65 and 66 the moving spot scans the negative 23 in a television like manner. The light passing the negative is by mirror 24 directed into the photoelectric cell 130. It causes there, in a known manner, currents to flow through various loops between the sections of potentiometer 133 and the various electrodes 132. The current in the last loop is, of course, the strongest and causes a corresponding voltage to be built up across resistor 135. This voltage is amplified by amplifier 301 and magnetizes, by means of the remagnetizing device 303, the moving ribbon 306 correspondingly. At the same time, the voltages built up across deflection plates 58 and 59, representing the two sweep circuits 65 and 67 are, by means of amplifier 321 and 322 and magnetizing devices 316 and 317, recorded upon ribbons 314 and 315. The three ribbons 306, 314 and 315 are mechanically tied together as shown in Fig. 9.

After the recording is finished, the modifying circuit, by means of handwheel 44 which actuates sliding contact 311 and by means of handwheel 45 which changes the shape of mask 180, are adjusted in the manner described, and the actual printing process can now be performed.

During this process, ribbon 306 is moved past the magnetic pick-up 307 where it creates electric currents which are fed into amplifier 309 and then used to deflect a luminous line formed on screen 158 of cathode ray tube 150. Part of the light of this luminous line passes mask 180 and impinges then on photoelectric cell 190. Due to the predetermined shape of mask 180 and the deflection of the luminous line by means of deflection plates 306 and the recorded and amplified photocell currents, the light reaching photoelectric cell 190 represents the correct mathematical function which must be used to modulate the light output of cathode ray tube 22 during the second, or printing operating cycle.

Photoelectric cell 190 is again preferably of the multiplier type and, consequently, a voltage substantially proportional to the light impringing upon it is impressed upon resistor 195. The condenser 400, or a more elaborate filter system used in its place, filters out the A. C. component of the photocell current which has been formed as a consequence of the luminous line upon screen 158 being formed by the movement of a luminous point by the saw tooth wave generator voltage which has been impressed upon the deflection plates 157. The voltage across resistor 195 is deducted from a constant bias voltage consisting of two portions, the first portion corresponding to the resistance 63′—63″ of potentiometer 63 which alone is effective during the first operating cycle, and the voltage corresponding to 63″—63‴ which is added during the second operating cycle. This last named voltage which is added to and the voltage across resistance 195 which is deducted from the minimum bias 63′—63″ is then, together with said minimum bias, impressed upon grid 55 where it causes the brilliancy of the moving spot upon screen 60 to change in the exact proportion required to control the contrast of the projected image in the desired manner, whereby the actual contrast C of the negative is changed into the desired contrast C′ of the projected image which, in turn, matches the available contrast range of the selected photographic paper.

During the second operating cycle, the movement of the luminous spot on screen 60 whereby the negative 23 is scanned in a television like manner, is not controlled by the sweep circuits 65 and 66 which are disconnected from the deflection plates 58 and 59 when switches 267 and 268 are placed in the position shown in dotted lines. Instead, the deflection plates are, respectively, connected to the amplifiers 323 and 324 into which currents are fed which are induced within the magnetic pick-ups 318 and 319 by the moving ribbons 314 and 315 containing the magnetic records of the sweep circuits as they performed during the first operating cycle when the photocell currents were recorded.

The mechanical connection between the recorded photocell current, ribbon 306, and the recorded sweep circuit voltages, ribbons 314 and 315, assures now synchronization between the intensity and the position of the luminous spot during the second operating cycle.

What I claim as new is:

1. In a photographic enlarger adapted to project an image of a photographic transparency on a sheet of sensitized material, a device to adjust the contrast of said projected image to match the contrast range of a selected sensitized material, comprising a cathode ray tube placed behind said transparency and adapted to illuminate it, including a source of electrons, a control grid, two sets of deflection plates disposed at right angles to each other, a screen capable of light emittance, and means to focus said electrons on a point of said screen, causing said point to emit light, a supply circuit for said tube including a constant negative bias operatively connected to said grid, and two linear sweep circuits of different frequencies operatively connected, respectively, to said two sets of deflection plates, whereby said light emitting point is caused to scan said transparency in a television like manner, a photoelectric cell adapted to pass current in accordance with the light impinging upon it, a supply circuit for said cell, means to direct the light of said cathode ray tube, after it has passed said transparency, into said photoelectric cell, means to render said last named means inoperative and to direct said light at the same time upon said sheet of sensitized material, means, operative when said light is directed into said photoelectric cell, to record the intensity of the current passing said cell as said point of light scans said transparency, means, operative when said light is directed upon said sheet of sensitized material, to play back said recorded current, means to feed said current as it is played back, into a modifying circuit adapted to convert it according to a selected mathematical function into an output voltage, and means to add said output voltage to said aforementioned constant bias of the control grid of said cathode ray tube, the device running through two consecutive operating cycles, during the first cycle said light being directed into said photocell, the photocell current being recorded by said recording means, and the bias of said control grid and thereby the brilliancy of said point of light being constant, and during the second cycle said light being directed upon said sensitized sheet, said recorded photocell current being played back and fed into said modifying circuit, and the bias of said control grid, and thereby the brilliancy of said point of light being modulated by the output voltage of said modifying circuit.

2. A device according to claim 1, said means to record the intensity of the current passing the photoelectric cell comprising a ribbon of magnetizable material, means to magnetize said ribbon in accordance with the intensity of said photocell current, and means to move said ribbon, during the recording process, past said magnetizing means.

3. A device according to claim 1, including means, operative during said first operating cycle, to record the intensities of the respective voltages of the two sweep circuits operating on said cathode ray tube, simultaneously with the recording of said photocell current, and means, operative during said second operating cycle, to disconnect said two sweep circuits from the deflection plates of said cathode ray tube, to connect said deflection plates to said recording device and to play back said recorded sweep voltages simultaneously with playing back said recorded photocell current, whereby automatically position and intensity of said luminous point on the screen of said cathode ray tube are correctly synchronized.

4. A device according to claim 1, including means, operative during said first operating cycle, to record the intensities of the respective voltages of the two sweep circuits operating on said cathode ray tube, simultaneously with the recording of said photocell current, and means, operative during said second operating cycle, to disconnect said two sweep circuits from the deflection plates of said cathode ray tube, to connect said deflection plates to said recording device and to play back said recorded sweep voltages simultaneously with playing back said recorded photocell current, whereby automatically position and intensity of said luminous point on the screen of said cathode ray tube are correctly synchronized, said recording device comprising three ribbons of magnetizable material and one ribbon of non-magnetizable material, the said three ribbons affixed in parallel relationship to said one ribbon, means to magnetize said first named three ribbons, respectively, in accordance with the voltages of the two sweep circuits and of the photocell, and means to move said ribbons during the recording process past said magnetizing means.

5. A device according to claim 1, adapted to increase the contrast of said projected image said modifying circuit adapted to change the photocell current into an output voltage substantially according to the formula $$e = A\left[1 - \left(\frac{i}{i_{max}}\right)^{\frac{-\Delta C}{C}}\right]$$

where $e$ is the output voltage,
$i$ is the input or photocell current,
$A$ is a constant,
$i_{max}$ is the maximum photocell current,
$C$ is the actual contrast of the transparency, and
$\Delta C$ is the difference between the actual contrast of the transparency and the desired contrast.

6. A device according to claim 1, adapted to increase the contrast of said projected image, said modifying circuit comprising means to add a first constant voltage of the magnitude "A" to said constant negative bias of the control grid of said cathode ray tube, and means to deduct simultaneously a second variable voltage $$e = A\left(\frac{i}{i_{max}}\right)^{\frac{-\Delta C}{C}}$$

from said constant negative bias, where $e$ is the output voltage,
$i$ is the input or photocell current,
$A$ is a constant,
$i_{max}$ is the maximum photocell current,
$C$ is the actual contrast of the transparency, and
$\Delta C$ is the difference between the actual contrast of the transparency and the desired contrast.

7. A device according to claim 1, said modifying circuit comprising means to add a first constant voltage to said constant negative bias of the control grid of said cathode ray tube, and means to deduct simultaneously a second variable voltage from said constant negative bias, the part of the modifying circuit generating said last named variable voltage comprising a second cathode ray tube, independent of said cathode ray tube named in claim 1, and equipped with a screen capable of light emittance, a supply circuit for said second cathode ray tube, including means to excite a straight line on said screen to light emittance, means to deflect said line substantially at right angles to itself in accordance with the recorded strength of the current passing the photoelectric cell named in claim 1, as it is being played back, an apertured mask made from opaque material placed in front of said screen, the width of said aperture in a direction substantially parallel to said light emitting line varying substantially according to the formula $$Y = F \cdot X^{-\frac{\Delta C}{C}}$$

where

Y is the width of said aperture, measured at the distance X from a point of reference.
F is a constant,
C is the actual contrast of said transparency, and
ΔC is the difference between the actual contrast of the transparency and the desired contrast.

a second photoelectric cell, independent from said cell named in claim 1, placed in front of said screen of the second cathode ray tube, and a supply circuit operatively connected to said second photoelectric cell, causing a current to pass said cell in proportion to the width of said mask at the place to which said light emitting line is, at any given instance, deflected by the recorded photocell current as it is being played back.

8. A device according to claim 1, said modifying circuit comprising means to add a first constant voltage to said constant negative bias of the control grid of said cathode ray tube, and means to deduct simultaneously a second variable voltage from said constant negative bias, the part of the modifying circuit generating said last named variable voltage comprising a second cathode ray tube, independent of said cathode ray tube named in claim 1, and equipped with a screen capable of light emittance, a supply circuit for said second cathode ray tube, including means to excite a straight line on said screen to light emittance, means to deflect said line substantially at right angles to itself in accordance with the recorded strength of the current passing the photoelectric cell named in claim 1, as it is being played back, an apertured mask made from opaque material placed in front of said screen, an adjustable mechanism adapted to alter the shape of the aperture of said mask, comprising an apertured frame, placed in front of the screen of the cathode ray tube and supporting the other elements of said mechanism, a plurality of movable cams, including means to move them in unison, a plurality of elongated members, each with two ends, said members adapted to slide in parallel tracks, a plurality of links, attached to each other and forming a chain adjacent to said aperture and covering part of it, and means, including spring biasing means operating on said links, adapted to establish operative contact between said chain and the first ends of said slidable members, and between the second ends of said slidable members and said cams, whereby more or less of the light passing width of said aperture is covered by said links and said members in accordance with the positions into which said cams are placed by the operator relative to said members, a second photoelectric cell, independent from said cell named in claim 1, placed in front of said screen of the second cathode ray tube, and a supply circuit operatively connected to said second photoelectric cell, causing a current to pass said cell in proportion to the width of said mask at the place to which said light emitting line is, at any given instance, deflected by the recorded photocell current as it is being played back.

9. A device according to claim 1, said modifying circuit comprising means to add a first constant voltage to said constant negative bias of the control grid of said cathode ray tube, and means to deduct simultaneously a second variable voltage from said constant negative bias, the part of the modifying circuit generating said last named variable voltage comprising a second cathode ray tube, independent of said cathode ray tube named in claim 1, and equipped with a screen capable of light emittance, a supply circuit for said second cathode ray tube, including means to excite a straight line on said screen to light emittance, means to deflect said line substantially at right angles to itself in accordance with the recorded strength of the current passing the photoelectric cell named in claim 1, as it is being played back, means under the control of the operator to adjust the strength of said current, an apertured mask made from opaque material placed in front of said screen, an adjustable mechanism adapted to alter the shape of the aperture of said mask, comprising an apertured frame, placed in front of the screen of the cathode ray tube and supporting the other elements of said mechanism, a plurality of movable cams, including means to move them in unison, a plurality of elongated members, each with two ends, said members adapted to slide in parallel tracks, a plurality of links, attached to each other and forming a chain adjacent to said aperture and covering part of it, and means, including spring biasing means operating on said links, adapted to establish operative contact between said chain and the first ends of said slidable members, and between the second ends of said slidable members and said cams, whereby more or less of the light passing width of said aperture is covered by said links and said members in accordance with the positions into which said cams are placed by the operator relative to said members, a second photoelectric cell, independent from said cell named in claim 1, placed in front of said screen of the second cathode ray tube, a supply circuit operatively connected to said second photoelectric cell, causing a current to pass said cell in proportion to the width of said mask at the place to which said line is, at any given instance, deflected by the recorded current passing the first photocell, as it is being played back, whereby the light output of the first cathode ray tube is modulated in accordance with current passing said second photocell and whereby said modulation is adjusted as a function of the maximum current passing said first photocell by adjusting the strength of the current fed into said modifying circuit, and as a function of the difference between actual and desired contrast by adjusting the shape of said mask.

ALFRED SIMMON.

No references cited.